US007873279B2

(12) United States Patent
Alameh et al.

(10) Patent No.: US 7,873,279 B2
(45) Date of Patent: Jan. 18, 2011

(54) LIGHT TRANSFER APPARATUS FOR AN ELECTRONIC DEVICE (75) Inventors: Rachid M. Alameh, Crystal Lake, IL (US); Mark A. Barabolak, Elmhurst, IL (US); Maninder S. Sehmbey, Hoffman Estates, IL (US); David R. Zeiger, Mundelein, IL (US); Robert A. Zurek, Antioch, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1043 days.

(21) Appl. No.: 11/622,068

(22) Filed: Jan. 11, 2007

(65) Prior Publication Data

US 2008/0170356 A1 Jul. 17, 2008

(51) Int. Cl.
*F21V 8/00* (2006.01)
*H04B 10/00* (2006.01)
*G02B 6/10* (2006.01)
*G02B 6/36* (2006.01)

(52) U.S. Cl. .................. 398/114; 398/102; 362/551; 362/602; 362/555; 362/558; 362/615; 455/556.1; 455/575.3; 359/154; 359/152; 359/163; 359/172

(58) Field of Classification Search ............... 398/114; 362/551; 359/203.1; 379/433.13
See application file for complete search history.

(56) References Cited

U.S. PATENT DOCUMENTS

| 5,889,602 | A * | 3/1999 | Johnson et al. ............ 398/131 |
| 5,949,565 | A * | 9/1999 | Ishida ........................ 398/131 |
| 6,470,132 | B1 * | 10/2002 | Nousiainen et al. ......... 385/146 |
| 7,074,045 | B2 * | 7/2006 | Kawahigashi et al. ......... 439/38 |
| 7,338,193 | B1 * | 3/2008 | Zeiger et al. ............... 362/551 |
| 7,353,049 | B2 * | 4/2008 | Mizuta ..................... 455/575.3 |
| 7,636,523 | B2 * | 12/2009 | Schorpp .................... 398/153 |
| 7,672,641 | B2 | 3/2010 | Yu et al. |
| 2003/0087610 | A1 * | 5/2003 | Ono .......................... 455/90 |
| 2004/0223689 | A1 * | 11/2004 | Lempkowski et al. ........ 385/26 |
| 2007/0032275 | A1 * | 2/2007 | Suzuki et al. ............ 455/575.3 |
| 2007/0065158 | A1 * | 3/2007 | Shindou et al. ............ 398/164 |
| 2007/0150764 | A1 * | 6/2007 | Chen ......................... 713/300 |

(Continued)

FOREIGN PATENT DOCUMENTS

GB 2406987 A 4/2005

(Continued)

OTHER PUBLICATIONS

Bianchi, Damiano: "The International Search Report and the Written Opinion of the International Searching Authority", European Patent Office, Rijswijk, completed: Jun. 11, 2008, mailed: Jun. 23, 2008, all pages.

*Primary Examiner*—Ken N Vanderpuye
*Assistant Examiner*—Oommen Jacob (57) ABSTRACT An electronic device [200] includes a housing [100] for containing circuitry [205] that generates a light beam. The electronic device includes pivotal portions [105, 110] of the housing. A light receiver [245] is associated with one of the housing pivotal portions. A light redirecting mechanism [215] is mounted at a predetermined location of the housing other than to the one pivotal portion thereof and is configured to redirect the light beam in a plurality of predetermined optical paths in which the light receiver is disposed with relative pivoting between the housing pivotal portions.

19 Claims, 5 Drawing Sheets

U.S. PATENT DOCUMENTS

| | | | |
|---|---|---|---|
| 2007/0153457 A1* | 7/2007 | Hosoya et al. | 361/681 |
| 2007/0286556 A1* | 12/2007 | Kassamakov et al. | 385/88 |
| 2008/0102888 A1* | 5/2008 | Sellgren et al. | 455/556.1 |
| 2008/0132300 A1* | 6/2008 | Gilmore et al. | 455/575.3 |
| 2008/0308755 A1* | 12/2008 | Hashizume et al. | 250/553 |
| 2010/0009727 A1* | 1/2010 | Presutti | 455/575.1 |

FOREIGN PATENT DOCUMENTS

| | | |
|---|---|---|
| WO | 0221730 A2 | 3/2002 |
| WO | 02057831 A1 | 7/2002 |
| WO | 2005034390 A2 | 4/2005 |

* cited by examiner

LIGHT TRANSFER APPARATUS FOR AN ELECTRONIC DEVICE

TECHNICAL FIELD

This invention relates generally to a light redirecting mechanism for an electronic device having pivotal portions.

BACKGROUND

Many cell phones are designed in a way that conserves space, making it easier for a user to carry. Some of the cell phones are designed as two rotatably connected housings that rotate or pivot open and then closed. These cell phones are known as "clamshell phones" or "rotator phones" depending on the orientation of the hinge to the housing halves. A clamshell phone typically includes a base portion, a rotatable portion, and a hinge to pivotally connect the base portion and the rotatable portion. When not in use, the rotatable portion usually lays flush against the base portion. In the event that the user desires to utilize the phone to make a phone call, send a text message, or view information stored in a memory of the phone, the user can open the phone by rotating the rotatable portion open. When a user opens the phone, the rotatable portion angularly rotates or pivots with respect to the hinge.

Clamshell phones often include a display and other elements, such as a camera lens, affixed to the rotatable portion. The base portion typically includes a processor that controls many elements of the clamshell phone, including elements located in the base portion as well as elements located in the rotatable portion. Due to the presence of the processor in the base portion and the need for various electronic components of the base portion needing to communicate with various electronic components in the rotatable portion, a communication path is required between the base portion and the rotatable portion.

Traditionally, copper wiring has been used as the communication path. When copper wiring is used, there is often a need for 50-60 copper wire lines between the rotatable portion and the base portion. These copper wire lines have been placed in a multi-layer (e.g., four or five layers are often used) flexible circuit extending between the base portion and the rotatable portion. The layers may be formed of a flexible plastic material in which the copper lines are mounted. The use of copper wiring is, however, problematic. For example, the use of the copper wiring can result in electromagnetic ("EM") radiation that affects the transmission across adjacent copper wires. The EM radiation results in noise that can adversely affect data transmission.

Some systems have reduced the number of lines by serializing the lines, resulting in fewer but higher speed lines. When the lines are serialized, multiple lines of data can be transmitted across a single line at different times. For example, the data for the first line may be transmitted, followed by the data for the second line, and then data for the third line, across a single copper line. A serialization embodiment is also subject to the same EM radiation problems that occur without serialization and could interfere more with cellular bands because the higher speed serialized signal is closer to the cellular band.

Another problem with using flexible circuits is their inherent unreliability. Specifically, the flexible circuits require use of many connectors that can lose their fidelity over time and use. Furthermore, flex copper lines can break down over extended use following many hundreds of rotational open/close bending. The physical connections required in current systems in the art are therefore problematic.

Optical communication following the process of serialization provides a viable solution to such problems. Serialization minimizes the number of data lines (e.g., possibly down to one data line) at the expense of higher speed. This makes the use of optical communication very practical due to the limited data lines (one transceiver is needed). Furthermore, low cost optical diodes (e.g., Vertical Cavity Surface Emitting Lasers ("VCSELs")) are readily available today and very capable of high speeds in the GHz range.

An additional problem with current clamshell phones is the requirement of circuitry to detect when the phone is in the open position or whether it is closed so that the phone knows whether to power the display or other circuitry in the rotatable portion and/or in the base portion.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

According to various embodiments described below, an electronic device, such as a wireless communication device, is provided having a housing for containing circuitry, such as a laser diode, for generating a light beam. The housing has pivotal portions. A light receiver is associated with one of the housing pivotal portions. A light redirecting mechanism is mounted to a predetermined location of the housing other than the pivotal portion to which the light receiver is mounted. The light redirecting mechanism is configured to redirect the light beam in a plurality of predetermined light or optical paths in which the light receiver is disposed with relative pivoting between the pivotal portions of the housing. The light redirecting mechanism may include light reflector portions and light transmissive portions disposed in the predetermined optical paths. In one form, the light redirecting mechanism is a light guide wheel with light reflector portions comprising a reflective light splitter in the wheel, where a single light beam is directed along a hinge axis between the housing pivotal portions, and the light transmissive portions comprising an outer circumferentially extending member of the wheel having predetermined light transmissive sections thereof. In another form, the electronic device includes a hinge about which the housing portions pivot and forming a hinge axis therebetween with both the light source and the light redirecting mechanism disposed along the hinge axis so that the light beam from the light source travels along the hinge axis to the redirecting mechanism.

For example, the wireless communication device or other electronic device may be a wireless clamshell phone having a rotatable portion and a base portion, and the light redirecting mechanism may be utilized to redirect light from the base portion to the rotatable portion. In one form, the light is infrared light and the light redirecting mechanism is located along the hinge axis of the phone. A light source, such as a laser diode, is located on the pivotal phone housing portion transmitting the light, and a light sensor, such as a photodetector or photodiode, is located on the other pivotal phone housing portion receiving the light. The light is utilized to transmit data and other information in an efficient and reliable manner between the base portion and rotatable portion without having to utilize problematic flexible circuits, for instance.

More specifically, the light guide wheel may be provided for directing light from a base portion of a clamshell phone to a rotatable portion thereof. Alternatively or in addition, the light guide wheel may be utilized to direct light from the rotatable portion to the base portion. The light may be infrared light and the light guide wheel may be located along the hinge axis of the phone. A light source, such as a laser diode, is located on the phone portion transmitting the light, and a light sensor, such as a photodetector or photodiode, is located on the other phone portion receiving the light.

In an embodiment where the light is traveling from the base portion to the rotatable portion, the light source may be located along the hinge axis. The light source transmits light toward one end of the hinge axis at which the light guide wheel is disposed. The light reflects off of a reflective light splitter or prism in the center of the light guide wheel in predetermined optical paths based on the configuration of the light splitter, such as generally radially out from the center of the wheel where the light splitter is disposed. In one illustrated form, the light splitter is aligned with the hinge axis so that the radial paths of the redirected light are transverse, and more specifically orthogonal to the hinge axis. In the illustrated form, the light splitter divides the light beam from the light source into two beams that are redirected radially toward predetermined circumferential locations about a peripheral or annular ring of the light wheel. The predetermined light paths can extend from the light reflector or splitter.

As an example, based on the splitter design, communication between the base and rotatable portion can be enabled via two windows for two discrete angular positions. The first is a rotatable-open and the other is a rotatable-closed with nothing in between if desired.

The outer cylinder or annular ring of the illustrated light wheel has two light transmissive sections each in a corresponding radial path of the light as redirected from the light reflector through which light can be transmitted. The rest of the ring of the light guide wheel may be coated with a reflective material to reflect any incident light back toward the interior of the ring and the opposite side of the light guide wheel. Alternatively, the ring may be coated with or formed of a material that substantially absorbs the light but does not allow the light to pass therethrough. In an embodiment having only two sections through which the light can pass, one of the sections of the wheel is positioned in alignment with the light reflector and a light sensor affixed to the rotatable portion when the clamshell phone is pivoted to the fully open position thereof. The other section is in alignment with the light sensor affixed to the rotatable portion when the phone is pivoted to a fully closed position thereof. The light sensor therefore only receives the redirected light when the rotatable portion is either in the open or closed positions. Manifestly, the number of predetermined optical or light paths can be varied so that more than the above-described two optical paths are provided by altering the configuration of the light guide wheel, and specifically the central light splitter or prism and the outer peripheral ring member thereof. In this manner, light can be transmitted to the sensor at several intermediate pivoted positions of the phone between the fully open or fully closed positions, for instance.

The use of such a light redirecting mechanism avoids the EM problems of current clamshell phones and provides for rapid optical data transfer. It also avoids the requirement of a sensor for detecting whether the phone is open or closed. In other words, establishing optical link between the base and rotatable portion when the wheel exit window and receiving diode are aligned is used to indicate an angular state of the phone (e.g., open or closed).

The embodiments described below are directed to use of a clamshell or rotator phone. However, it should be appreciated that these teachings are also applicable to other electronic devices utilizing pivotal portions where optical data is transferred between the pivotal portions, such as a portable notebook computer. Moreover, some embodiments described below are directed to arrangements where a light beam is generated so as to be directed along a hinge axis toward a light redirecting mechanism, such as a light guide wheel. It should be appreciated, however, that in some embodiments the light beam can be generated so as to be directed in another direction first, before being directed along the hinge axis toward the light redirecting mechanism. For example, the light beam may be transmitted from a location on the base portion so as to be directed toward the hinge axis in a direction perpendicular thereto. In this instance, a light pipe can be utilized to redirect the light to travel along the hinge axis for being redirected in one of a plurality of predetermined optical paths by the light redirecting mechanism, at least one of which is toward a light receiver disposed on the rotatable portion of the phone.

Figure 1:
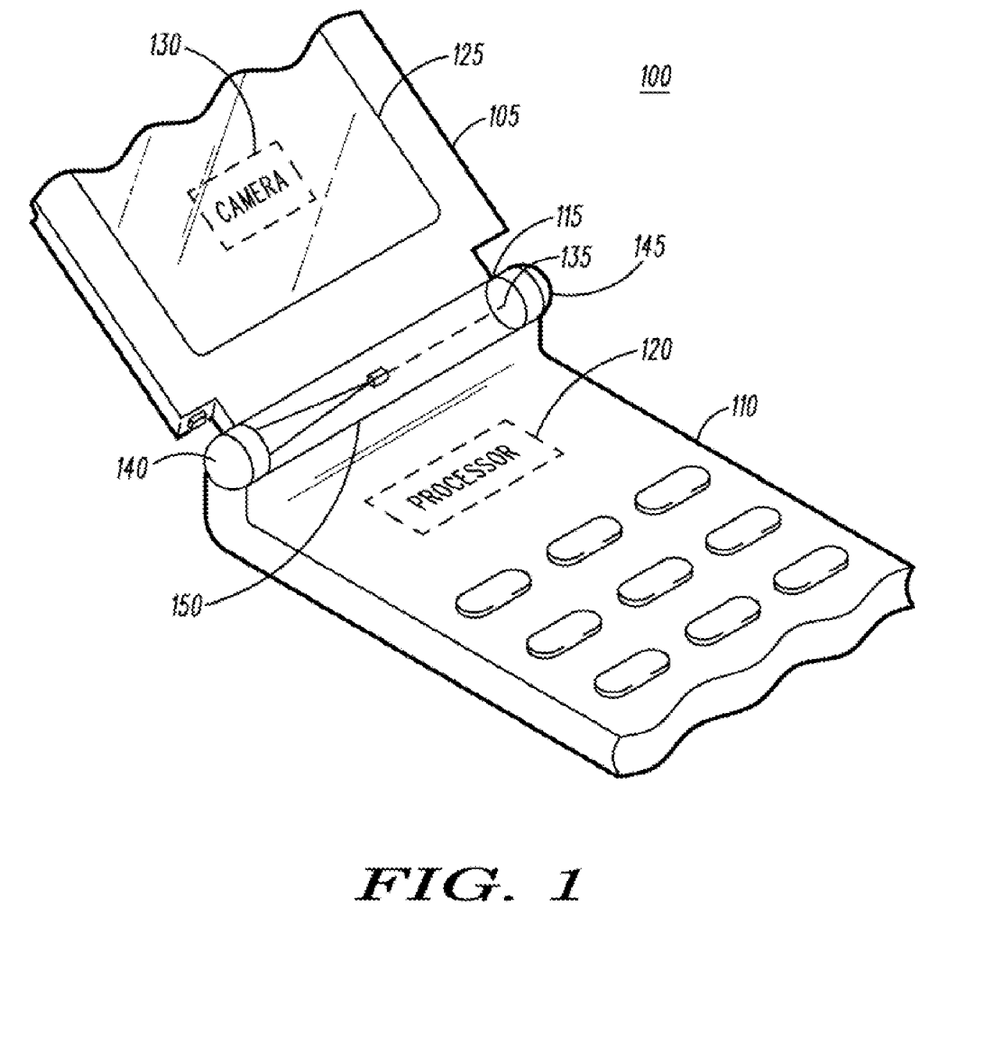
FIG. 1 is a perspective view of a clamshell phone in accordance with one form of the invention showing rotatable and base portions thereof with a hinge therebetween.

FIG. 1 is a perspective view of a clamshell phone in accordance with one form of the invention showing rotatable and base portions thereof with a hinge therebetween. The phone 100 includes a rotatable portion 105 and a base portion 110. The rotatable portion 105 is coupled to the base portion 110 via a hinge 115. The base portion 110 may include various electronic components, including a processor 120. The rotatable portion 105 may include electronic components of its own, such as a display 125 and a camera 130. The camera 130 is shown with dashed lines to indicate that is located on the side of the rotatable portion 105 opposite from the side on which the display 125 is shown. The location of the major electronic parts highly impact the speed of the serialized link required between the base 110 and the rotatable portion 105 which, in turn, impacts the optical design complexity (less data lines between base and the rotatable portion 105 results in lower serialized link and simpler overall optical transceiver design). As an example, a phone in which all components are in the rotatable portion with the exception of a keypad and battery located in the base portion would only require a very low speed optical path between the base 110 and the rotatable portion 105.

The hinge or hinge mechanism 115 that allows relative pivoting between the rotatable portion 105 and base portions 110 can be of any known type for rotating phones 100. As shown, the base portion 110 includes a pair of upstanding bosses 140, 145 at either lateral side at the end thereof adjacent the rotatable portion 105, and the rotatable portion 105 includes an elongated hinge portion 150 that extends between the laterally spaced bosses 140, 145. The bosses 140, 145 and hinge portion 150 can be provided with aligned apertures for receipt of pivot pins therein which extend along hinge axis 135 of the phone 100. Alternatively, a single hinge pin can be provided where the hinge portion 150 has a through bore aligned with the boss apertures. A user may manually pivot the phone 100 via the hinge 115 between an "open" position and a "closed" position about the hinge axis 135. In the closed position, the rotatable portion 105 lies against and on top of the base portion 110. In the open position, the rotatable portion 105 extends away from the base portion 110 generally at an oblique angle thereto.

The rotatable portion 105 of the phone 100 includes various circuitry and electronic elements that need to communicate with other circuitry or electronic elements in the base portion 110. For example, as discussed above, the rotatable portion 105 may include a display 125 and a camera 130, whereas the base portion 110 includes a processor 120. For simplicity of design, some clamshell phones 100 include only a single processor that controls electronic elements in the rotatable portion, such as the display 125 and the camera 130.

To facilitate communication of data and other information between the rotatable portion 105 and the base portion 110, the phone 100 includes one or more light redirecting mechanisms, such as light guide wheels, to optically transfer the data and other information, as discussed below.

Figure 2:
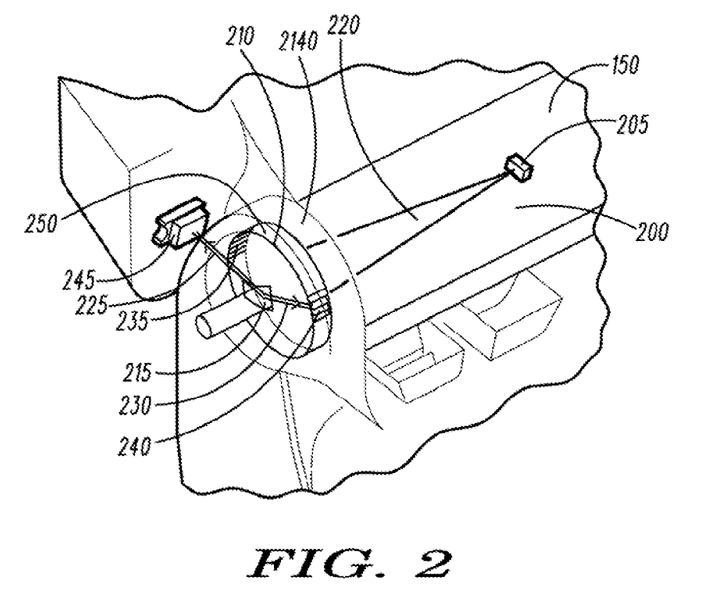
FIG. 2 is an enlarged, fragmentary perspective view of the hinge showing a light transfer apparatus including a light guide wheel oriented along the hinge axis with the rotatable portion pivoted open relative to the base portion.

FIG. 2 is an enlarged, fragmentary perspective view of the hinge showing a light transfer apparatus 200 including a light guide wheel 210 oriented along the hinge axis 135 such as in one of the bosses 140, 145 of the base portion with the rotatable portion pivoted open relative to the base portion. As shown, the light transfer apparatus 200 also includes a light source 205, and a reflector, and more specifically a reflective light splitter 215 of the wheel 210, that are also oriented along the hinge axis 135. In this regard, the light source 205 can be mounted on the base portion 110 of the phone 100 so that it is oriented along the hinge axis 135 in the hinge portion 150 of the rotatable portion 105 of the phone 100.

The light source 205 generates an initial light beam 220 utilized to optically transfer data and or other information from the base portion 110 to the rotatable portion 105. Although only one light transfer apparatus 200 is shown in FIG. 2, it should be appreciated that a second light transfer apparatus may be included to optically transfer data and other information via another light beam from the rotatable portion 105 to the base portion 110, as discussed below with respect to FIG. 10.

The light source 205 may be controlled by the processor 120 shown in FIG. 1. When the processor 120 determines that data or other information is to be transmitted from the base portion 110 to the rotatable portion 105, the processor 120 generates a stream of the data to be transferred and causes the light source 205 to generate the initial light beam 220 to transfer the data. The light source 205 may generate an infrared light beam or light of any other suitable wavelength to transfer the data.

The initial light beam 220 is directed toward the reflective light splitter 215 located near one end of the hinge axis of the phone 100. The reflective light splitter 215 is located in a selected position when initially installed along the hinge axis to reflect light beams in one or more specific directions. In one embodiment of the invention, the initial light beam 220 is split into two different light beams by the reflective light splitter 215. As shown in FIG. 2, the initial light beam 220 is split into a first reflected light beam 225 and a second reflected light beam 230. The reflective light splitter 215 may be disposed along the hinge axis and may receive the initial light beam and split the initial light beam into the first reflected light beam 225 and a second reflected light beam 230, each of which are reflected at a predetermined angle transverse to the hinge axis.

Upon reflection, the first reflected light beam 225 and the second reflected light beam 230 are directed toward an outer peripheral ring 250 of the light guide wheel 210. Referring to FIG. 2, the light guide wheel 210 has a disc configuration. The light guide wheel 210 includes at least two locations at which the first reflected light beam 225 and the second reflected light beam 230 exits the light guide wheel 210 from the outer ring 250 thereof. That is, there are at least two locations or sections along the ring 250 of the light guide wheel 210 aligned with the redirected light paths generated by the light splitter 215 so that the first reflected light beam 225 and the second reflected light beam 230 may exit the light transfer apparatus 200. As shown, the ring 250 includes a first exit location 235 and a second exit location 240 which are both of light which are both of light transmissive material. When the initial light beam 220 is generated by the light source 205 and directed at the reflective light splitter 215, the first reflected light beam 225 passes through the first exit location 235, and the second reflected light beam 230 passes through the second exit location 240.

The rotatable portion 105 of the phone 100 includes a light sensing element 245, such as a photodiode, to sense light emitted from the first exit location 235 and the second exit location 240 of the light guide wheel 210. When the phone 100 is in the open position, the light sensing element 245 is in alignment with the first exit location 235 in the predetermined light path. When the phone 100 is in the closed position, on the other hand, the light sensing element 245 is in alignment with the second exit location 240 in another predetermined light path. Accordingly, when the phone 100 is in the open position, the first reflected light beam 225 is directed at the light sensing element 245, and when the phone 100 is in the closed position, the second reflected light beam 230 is directed at the light sensing element 245.

When the phone 100 is in the process of being opened or closed, but is not yet in the fully open or fully closed position, substantially none of the reflected light will be received by the light sensing element 245, as the light sensing element moves with the rotatable portion to which it is mounted and is therefore not in position to receive the reflected light. In some other embodiments, the reflective light splitter 215 is configured with reflector portions such that additional reflected light beams are reflected through exit locations or sections other than the first exit location 235 and the second exit location 240 so that data and other information can be sent from the base portion 110 to the rotatable portion 105 during the opening and/or closing of the phone 100. In these other embodiments, the light splitter 215 could be multifaceted with a single facet for each exit location, or it could be a smooth cone shape that would distribute the light equally over 360 degrees.

The light transfer apparatus 200 may remain fixed during the opening or closing of the phone 100. That is, the light transfer apparatus 200 is mounted along the hinge axis to a portion of the hinge that remains stationary relative to the base portion 110 while the rotatable portion 105 is moved between the open and closed positions. As such, the initial light beam 220 is always reflected by the reflective light splitter 215 to form the first reflected light beam 225 and the second reflected light beam 230. The light sensing element 245, on the other hand, moves because it is mounted to the rotatable portion 105. Accordingly, the light sensing element 245 will only receive the first reflected light beam 225 when in the open position and the light sensing element 245 will only receive the second reflected light beam 230 when the phone 100 is in the closed position. The reflected light beams from the reflective light splitter 215 is detected by the light sensing element 245 whenever the phone 100 is entirely open or closed. Accordingly, complex circuitry to detect whenever the phone 100 is open or closed is therefore not required and a relatively simple light transfer apparatus 200 is realized.

Figure 3:
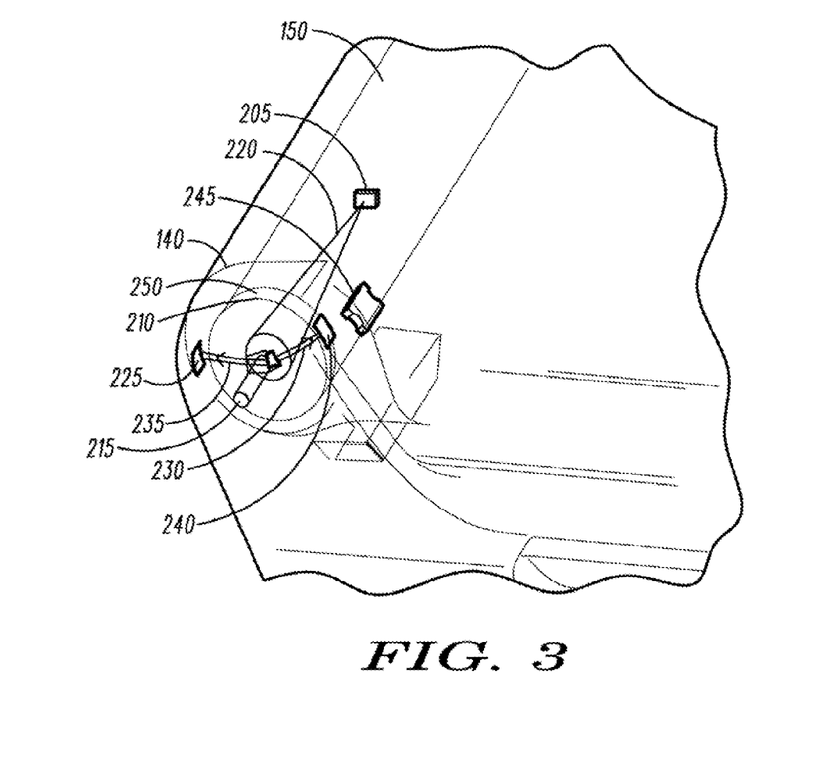
FIG. 3 is a view similar to FIG. 2 but showing the rotatable portion and base portion pivoted to a closed position.

FIG. 3 is a view similar to FIG. 2 but showing the rotatable portion and base portion pivoted to a closed position. As shown, when in the closed position the light source 205 generates the initial light beam 220 that is directed toward the reflective light splitter 215. The initial light beam 220 is split into the first reflected beam 225 directed toward the first exit location or section 235, and the second reflected beam 230 is directed toward the second exit location or section 240. Because the phone 100 is closed, the second reflected light beam 230 is received by the light sensing element 245, instead of the first reflected light beam 225 being received by the light sensing element 245, as was shown in FIG. 2 when the phone 100 was in the open position.

Figure 4:
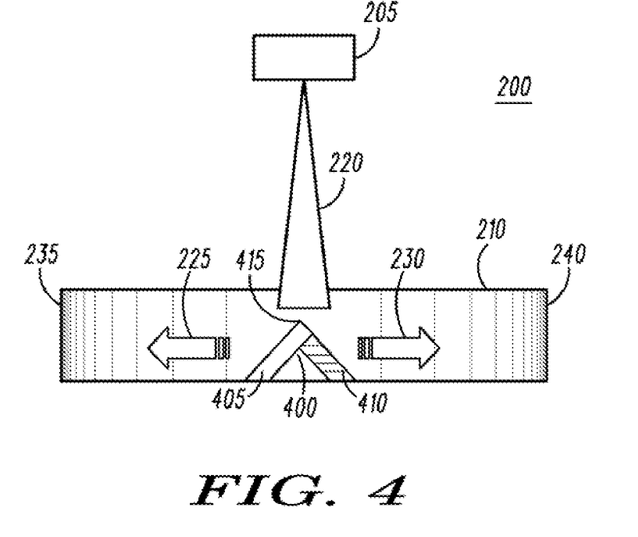
FIG. 4 is a diagrammatic view of the light guide wheel showing a reflective light splitter thereof.
Figure 5:
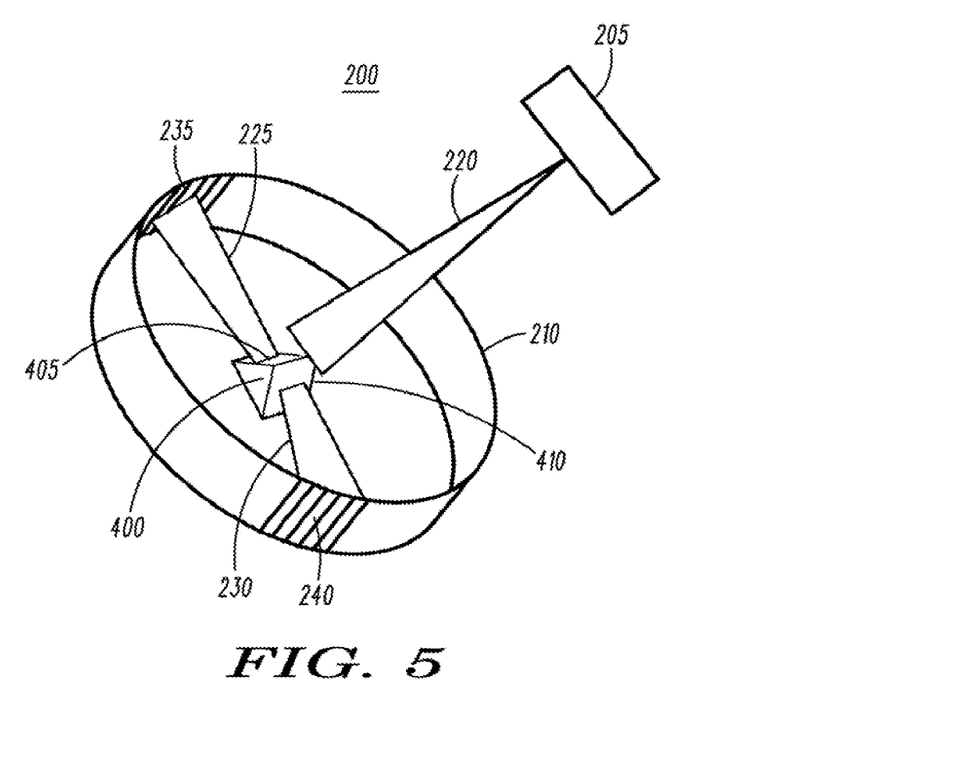
FIG. 5 is a diagrammatic view of the light guide wheel showing the light splitter redirecting light toward light transmissive sections of a peripheral annular ring of the light guide wheel.

FIG. 4 is a diagrammatic view of the light guide wheel showing a reflective light splitter thereof, and FIG. 5 is a diagrammatic view of the light guide wheel showing the light splitter redirecting light toward a light transmissive section of a peripheral annular ring of the light guide wheel. As shown, the light source 205 directs the initial light beam 220 toward a reflective light splitter 215. The light splitter 215 can be in the form of a prism 400 having light reflective surfaces 405 and 410 that meet at an apex 415 therebetween and extend away from each other at an angle therebetween. To have the first reflected light beam 225 reflected toward the first exit location 235 of the light guide wheel 210, and the second reflected light beam 230 reflected toward the second exit location 240. The light beam 220 is wide enough to have portions thereof directed at both reflective surfaces 405 and 410 of the prism 400. In this regard, the apex 415 between the surfaces 405 and 410 can be generally aligned with the center of the beam 220 on the hinge axis 135.

As shown in FIG. 5, an outer peripheral ring of the light guide wheel 210 has an annular configuration. The portions of the light guide wheel 210 other than the first exit location 235 and the second exit location 240 may be coated with or formed of a reflective material such that any reflected light not exiting the light guide wheel through the first exit location 235 or the second exit location 240 is reflected off the inside of the outer peripheral ring of the light guide wheel 210 and back toward the other side of the outer peripheral ring until it exits through the first exit location 235 or the second exit location 240.

Figure 6:
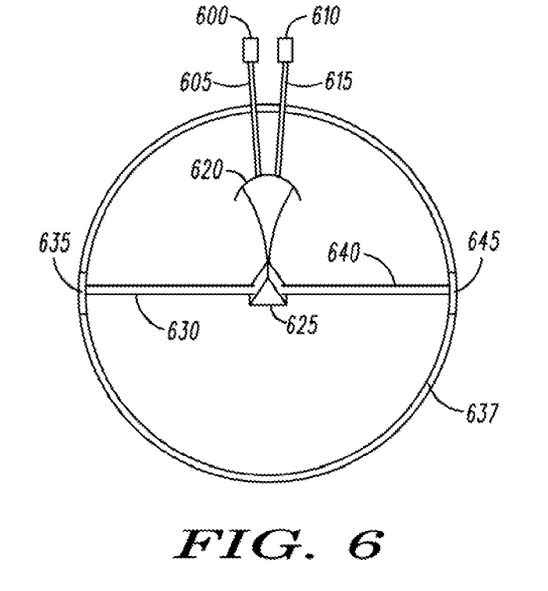
FIG. 6 is a diagrammatic view of a light redirecting mechanism for redirecting light from two light sources including a lens for focusing light from the light sources at the light reflector.

In alternative embodiments, multiple light sources may be utilized to transfer data or other information from the base portion 110 to the rotatable portion 105. FIG. 6 is a diagrammatic view of a light redirecting mechanism for redirecting light from two light sources including a lens for focusing light from the light sources at the light reflector. As shown, the light redirecting mechanism includes a first light source 600 for generating a first initial light beam 605 and a second light source 610 for generating a second initial light beam 615. Control information to drive the display may be transmitted via the first initial light beam 605 and data to drive the camera may be transmitted via the second initial light beam 615. The first initial light beam 605 has a different wavelength than the second initial light beam. For example, the first initial light beam may be an infrared light beam having a wavelength of about 830 nm, and the second initial light beam may be have a wavelength of about 880 nm. The first light source 600 and the second light source 610 may both generate their respective light beams at the same time.

The first initial light beam 605 and the second initial light beam 615 are both directed substantially along the hinge axis toward a focusing lens 620. The focusing lens 620 is utilized to direct the first initial light beam 605 and the second initial light beam 615 onto a reflective light splitter 625. The reflective light splitter 625 splits the incident light into a first reflected light beam 630 directed toward a first exit location or section 635 of a light guide wheel 637, and second reflected light beam 640 toward a second exit location or section 645 of the light guide wheel 637.

In the event that the first light source 600 and the second light source 610 transmit their respective light beams at the same time, the light beams are combined by the focusing lens 620. Accordingly, the focusing lens 620 effectively combines the first initial light beam 605 and the second initial light beam 615 into a single light beam have two different wavelengths (i.e., one for the wavelength of the first initial light beam 605 and another for the wavelength of the second initial light beam 615. This is known as wavelength division multiplexing. Similarly, the first reflected light beam 630 and the second reflected light beam 640 also contain two wavelengths.

The wavelengths are filtered at the first exit location 635 and the second exit location 645. Wavelength division multiplexing (i.e., transmitting different signals via different wavelengths over the same optical path) provides the added benefit of communicating different signals optically over the same path without the need for serialization. Another reason why two different light sources are used is because in this particular embodiment, data or other information that is only intended to be received by the phone when in, for example, the open position is transmitted via the first initial light beam 605 and other data or information that is only intended to be received by the phone when in the closed position is transmitted via the second initial light beam 615. To ensure that only the data from the first initial light beam 605 is received when the phone is in the open position, the first exit location 635 may include a first filtering material to substantially filter or inhibit light having the second wavelength from passing therethrough when the first exit location 635 is disposed adjacent to the light receiver when the phone is in the open position. Similarly, the second exit location 645 may include a second filtering material to substantially filter or inhibit light having the first wavelength from passing therethrough when the second exit location 645 is disposed adjacent to the light receiver when the phone is in the closed position.

In other embodiments, the first light source 600 and the second light source 710 are spaced far enough apart such their respective light beams are not reflected off of the apex of the light splitter 625. Instead, the first light beam is reflected only toward the first exit location or section 635 and the second light beam 615 is reflected only toward the second exit location 645, in which case filtering material would not be required around the first exit location 635 or the second exit location 645.

In another alternative embodiment, two light sources may be utilized, but are used to intermittently transfer the data or other information by intermittently directing their respective light beams in the direction of the reflective light splitter.

Figure 7:
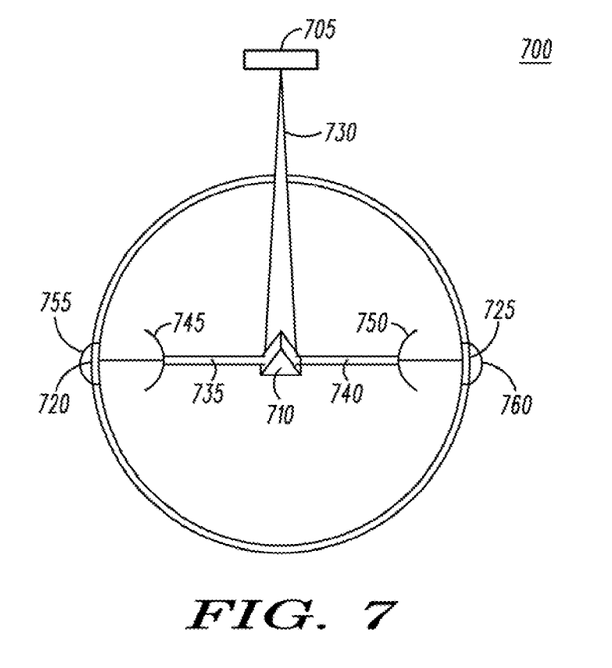
FIG. 7 is a diagrammatic view of an alternative light guide wheel showing focusing lenses disposed in the light path, between the light splitter and light transmissive section.

FIG. 7 is a diagrammatic view of an alternative light guide wheel showing focusing lenses disposed in the light path, between the light splitter and light transmissive section. As shown, the light transfer apparatus 700 includes a light source 705, a reflective light splitter 710, and a light guide wheel 715. The light guide wheel 715 includes a first exit location or section 720 and a second exit location or section 725. The light source 705 generates an initial light beam 730 that is reflected off of the reflective light splitter 710 to generate a first reflected light beam 735 and a second reflected light beam 740. The first reflected light beam 735 is directed toward the first exit location 720 and the second light beam 740 is directed toward the second exit location 725. FIG. 7 differs from the embodiments shown in FIGS. 2-6 in that a first focusing lens 745 is included to direct the first reflected light beam 735 onto the first exit location 720, and a second focusing lens 750 is utilized to direct the second reflected light beam 740 onto the second exiting location 725.

Additional focusing lenses 755 and 760 can be placed right on the first exit location or section 720 and the second exit location or section 725, respectively. The additional focusing lenses 755, 760 are used to focus the light before it is transmitted in air toward the light sensing element. It should be appreciated that in some embodiments only the focusing lenses 745 and 750 are utilized, instead of the combination of the focusing lenses 745 and 750 and the additional focusing lenses 755 and 760. In other embodiments the additional focusing lenses 755 and 760 are used within the focusing lenses 745 and 750.

The focusing lenses 745, 750 ensure that the respective reflected light beams 735, 740 are properly directed onto the respective exit locations 720, 725 on the light guide wheel 715. The use of such focusing lenses 745, 750 corrects for a certain range of error that could be caused if components of the light transfer apparatus 700 shift slightly in the event that, for example, a user drops the clamshell phone onto a hard surface such as the ground.

Figure 8:
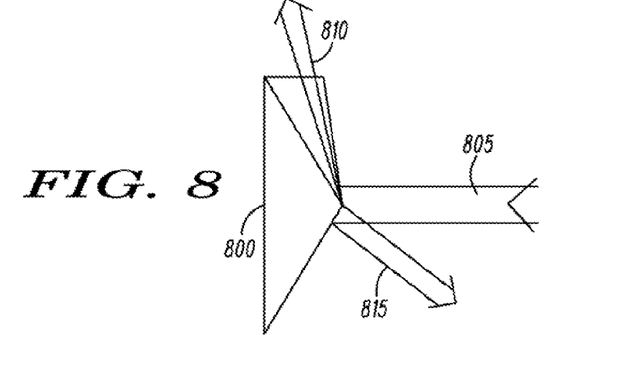
FIG. 8 is a diagrammatic view of a light prism for redirecting light in predetermined oblique optical paths.

For the sake of simplicity in explaining various embodiment of the invention, FIGS. 2-7 each illustrate embodiments where a light splitter reflects light in symmetrical paths. It should be appreciated, however, that there are many embodiments in which the light reflected from a light splitter or light prism will not be reflected at symmetrical angles. FIG. 8 is a diagrammatic view of a light prism 800 for redirecting light in predetermined oblique optical paths. The light prism 800 shown in FIG. 8 may be used instead of the light splitters 215, 625, and 710 in the various embodiments of light redirecting apparatuses discussed above with respect to FIG. 2-7.

As shown, an initial light beam 805 is directed toward the light prism 800. The light prism may be disposed along the hinge axis discussed above with respect to FIGS. 2-7, in which case the initial light beam 805 is directed substantially along the hinge axis. The initial light beam 805 is split into two or more reflected light beam after coming in contact with the light prism 800. As shown, a first reflected light beam 810 reflects off one side of the light prism 800 and a second reflected light beam 815 reflects off of another side of the light prism 800. In this case, the first reflected light beam 810 and the second reflected beam 815 are reflected in non-symmetrical directions. In other words, the first reflected light beam 810 and the second reflected beam 815 are reflected in different geometric planes. Referring to an x-y-z coordinate plane where the origin of the x-y-z coordinate plane is located at the tip of the light prism 800 and the initial light beam 805 is directed toward the light prism 800 in a negative direction along the x-axis, the first reflected light beam 810 is reflected in the negative x-direction, positive y-direction, and positive z-direction. The second reflected light beam 815, on the other hand, is reflected in the positive x-direction, negative y-direction, and negative z-direction.

Figure 9:
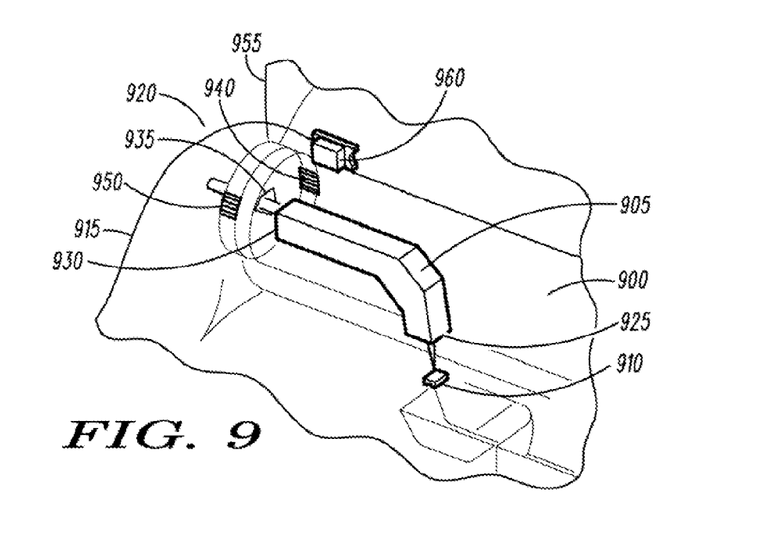
FIG. 9 is a fragmentary, perspective view of the hinge showing an alternative light transfer apparatus including a light pipe for directing light along the hinge axis.

FIGS. 2-8 each depict embodiments where a light source generates and directs a light beam in the direction of the reflective light splitter. In other embodiments, however, the light source can instead be disposed in a location away from the hinge axis of the phone. FIG. 9 is a fragmentary, perspective view of the hinge showing an alternative light transfer apparatus 900 including a light pipe 905 for directing light along the hinge axis. As illustrated, a light source 910 is disposed within the base portion 915 of a clamshell phone 920. The light pipe 905 includes a first end 925 located facing the light source 910. A light beam generated by the light source 910 is received within the first end 925 and is reflected over to a second end 930 that faces a reflective light splitter 935. The light beam is reflected off the reflective light splitter 935 and splits into two reflected light beams. A first reflected light beam is directed toward a first exit location or section 940 of a light guide wheel 945, and a second reflected light beam is directed toward a second exit location or section 950 of the light guide wheel 945. A rotatable portion 955 of the phone 920 includes a light sensing element 960 to sense a light beam. As with the embodiments shown in FIGS. 2-7, if the phone 920 is in the open position, the first reflected light beam will pass through the first exit location 940 and be received by the light sensing element 960. On the other hand, if the phone 920 is in the closed position, the second reflected light beam will pass through the second exit location 950 and be received by the light sensing element 960.

Figure 10:
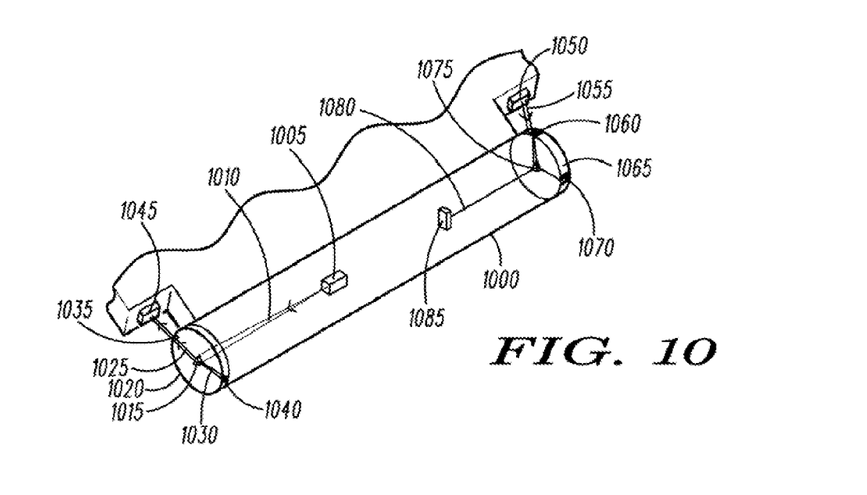
FIG. 10 illustrates an enlarged, fragmentary perspective view of a hinge of a clamshell phone showing two light transfer apparatuses, one for directing a first light beam to the rotatable portion, and the other for directing a second light beam from the rotatable portion down to a light receiver disposed along a hinge axis.

FIG. 10 illustrates an enlarged, fragmentary perspective view of a hinge 1000 of a clamshell phone showing two light transfer apparatuses, one for directing a first light beam to the rotatable portion, and the other for directing a second light beam from the rotatable portion down to a light receiver disposed along a hinge axis. As shown, a first light source 1005, such as a laser diode, generates a first initial light beam 1010 that is directed along the hinge axis toward a first reflective light splitter or prism 1015. As with the embodiments discussed above with respect to FIGS. 2-9, the first reflective light splitter 1015 may be disposed along the center of the hinge axis and reflects the first initial light beam, 1010 in one of more predetermined optical paths that are transverse to the hinge axis. The first reflective light splitter 1015 reflects light beams toward an outer peripheral or annular ring of a first light guide wheel 1020. A first reflected light beam 1025 is directed toward a first exit location or section 1035 and a second reflected light beam 1030 is directed toward a second exit location or section 1040 of the first light guide wheel 1020. The first exit location 1035 and the second exit location 1040 may each be formed of a light transmissive material to allow light to pass therethrough. When the phone is in the open position, a light receiver 1045 associated with the rotatable portion is disposed adjacent to and facing the first exit location 1035 such that the first reflected light beam 1025 passes through the first exit location 1035 and is received by the light receiver 1045. When the phone is in the closed position, on the other hand, the light receiver 1045 is disposed adjacent to and facing the second exit location 1040 such that the second reflected light beam 1030 passes through the second exit location 1040 and is received by the light receiver 1045. The first light transfer apparatus is therefore utilized to permit the optical transmission of data or other information from the base portion of the phone to the rotatable portion via the first reflective light splitter 1015 and the first light guide wheel 1020.

A second light transfer apparatus is utilized to permit the optical transmission of data or other information from the rotatable portion of the phone to the base portion. A second light source 1050 is disposed on the rotatable portion. The second light source 1050 generates a second initial light beam 1055. When the phone is in the open position, the second initial light beam 1055 passes through a first entrance location or section 1060 of a second light guide wheel 1065. When the phone is in the closed position, the second initial light beam 1055 passes through a second entrance location or section 1070 of the second light guide wheel 1065. As with the first and second exit locations 1035, 1040 of the first light guide wheel 1020, the first and second entrance locations 1060, 1070 of the second light guide wheel 1065 are formed of a light transmissive material. Once the second initial light beam 1055 has entered the first entrance location 1060 or the second entrance location 1070, it reflects off of a reflective surface or mirror 1075 and a reflected light beam 1080 is directed along the hinge axis toward a second light receiver 1085 that may be disposed within the hinge 1000 along the hinge axis.

According to various embodiments described herein, a light guide wheel is provided for directing light from a base portion of a phone to a rotatable portion. Alternatively, the light guide wheel may be utilized to direct light from the rotatable portion to the base portion. A hinge is located between the base portion and the rotatable portion about which the base and the rotatable portions are pivotal relative to each other and a hinge axis is defined therebetween. The light may be infrared light and the light guide wheel may be located along the hinge axis of the phone. A light source, such as a laser, is located on the side transmitting the light, and a light sensor, such as a photodetector or photodiode, is located on the side receiving the light.

In an embodiment where the light is traveling from the base portion to the rotatable portion, the light source may be located along the hinge axis. The light source transmits a light beam toward an edge of the hinge axis. Alternatively, a light pipe is used to direct the light beam toward the edge of the hinge axis. The light reflects off of a reflective light splitter in the center of a light guide wheel. The wheel has the shape of a cylinder and contains at least two paths through which light can be transmitted. The rest of the light guide wheel may be coated with a reflective material to reflect the incident light back toward the opposite side of the light guide wheel. Alternatively, the wheel may be coated with or formed of a material that substantially absorbs the light but does not allow the light to pass through. The light guide wheel is utilized to direct the light. In an embodiment having only two areas through which the light can pass, one of the areas of the wheel is positioned next to where a light sensor affixed to the rotatable portion is mounted when the phone is completely in the open position. The other area is positioned next to where the light sensor affixed to the rotatable portion would be if the phone were completely open. The light therefore is only received by the sensor when the rotatable portion is either completely open or completely closed.

In alternative embodiments, the light beam can be transmitted in another direction toward the light redirecting mechanism other than along the hinge axis. For example, the light beam may be transmitted from a light source located within the base portion toward the hinge axis in a direction perpendicular to the hinge axis. Upon reaching a light redirecting mechanism located along the hinge axis, the light beam would be redirected in one of a plurality of predetermined optical paths, at least one of which is toward a light receiver disposed within the rotatable portion of the phone.

The use of such a light redirecting mechanism avoids the EM problems of current clamshell phones and provides for rapid optical data transfer. It also avoids the requirement of a sensor for detecting whether the phone is open or closed.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. An electronic device comprising:
    a housing for containing circuitry that generates a light beam;
    pivotal portions of the housing;
    a hinge between the pivotal portions of the housing, thereby defining a hinge axis between the pivotal portions of the housing;
    a light receiver optically coupled with one of the pivotal portions of the housing; and
    a light redirecting mechanism mounted on at least one pivotal portion of the housing and different from where the light receiver is mounted and configured to redirect the light beam in a plurality of predetermined optical paths, wherein the light redirecting mechanism is aligned with the hinge axis so that radial paths of the redirected light beam are orthogonal to the hinge axis; and further comprising:
    a light wheel that receives the redirected light beam at predetermined circumferential locations about a peripheral or annular ring of the light wheel, wherein the light beam is redirected radially.

2. The electronic device of claim 1 wherein the pivotal portions of the housing comprise base and rotatable portions of a wireless communication device, the light receiver is associated with the rotatable portion, and the predetermined optical paths include one optical path with the rotatable portion pivoted to a closed position relative to the base portion and another optical path with the rotatable portion pivoted to an open position relative to the base portion.

3. The electronic device of claim 2 wherein the predetermined optical paths include another optical path with the rotatable portion pivoted to a partially open position between the open and closed positions relative to the base portion.

4. The electronic device of claim 1 wherein the light redirecting mechanism includes light reflector portions and light transmissive portions that are disposed in the predetermined optical paths.

5. The electric device of claim 4 wherein the light redirecting mechanism comprises a light guide wheel, the light reflector portions comprise a reflective light splitter in the wheel and the light transmissive portions comprise an outer circumferential member of the wheel having predetermined light transmissive sections thereof.

6. The electronic device of claim 5 wherein at least one of the predetermined light transmissive sections includes a focusing lens to focus the redirected light beam in one of the optical paths in which the light receiver is disposed.

7. The electronic device of claim 1 wherein the circuitry comprises a light source for generating the light beam with the light source being associated with the other pivotal portion of the housing.

8. The electronic device of claim 7 including a hinge between the housing pivotal portions for allowing pivoting thereof and forming a hinge axis there between with both the light source and the light redirecting mechanism disposed along the hinge axis so that the light beam from the light source travels along the hinge axis to the redirecting mechanism.

9. The electronic device of claim 7 including a hinge between the housing pivotal portions for allowing pivoting thereof and forming a hinge axis there between with the light source being disposed off of the hinge axis and the light redirecting mechanism being disposed along the hinge axis, and
a light pipe configured to receive the light beam from the light source and redirect the light beam along the hinge axis toward the light redirecting mechanism.

10. A wireless communication device, comprising:
a base portion including circuitry to generate a light beam for transmitting data optically;
a rotatable portion including a light receiver to receive the light beam; and
a hinge between the base portion and the rotatable portion about which the base and the rotatable portions are pivotal relative to each other and defining a hinge axis there between; and
a light redirecting mechanism generally oriented along the hinge axis for receiving the light beam and redirecting the light beam to travel in predetermined optical paths that extend transversely to the hinge axis and in which the light receiver is disposed with relative pivoting of the rotatable and base portions, and wherein the light redirecting mechanism further comprises a light wheel that receives the redirected light beam at predetermined circumferential locations about a peripheral or annular ring of the light wheel, wherein the light beam is redirected radially.

11. The wireless communication device of claim 10 wherein the light redirecting mechanism comprises a light guide wheel, the rotatable portion including the light receiver comprises a central prism of the wheel and the light transmissive portions comprise an outer ring member of the wheel extending circumferentially about the central prism and having predetermined light transmissive sections thereof.

12. The wireless communication device of claim 10 wherein the rotatable portion includes at least one of a camera and a display, and the base portion includes at least a processor for generating control data for the camera and display to optically transmit to the rotatable portion.

13. The wireless communication device of claim 10 wherein the base portion circuitry is configured for generating a second light beam, and the light redirecting mechanism includes a first light transmissive portion including a first filtering material to substantially inhibit the second light beam from being received by the light receiver so that only the first light beam is received by the light receiver with the base and rotatable portions pivoted to a first predetermined position relative to each other, and a second light transmissive portion including a second filtering material to substantially inhibit the first light beam from being received by the light receiver so that only the second light beam is received by the light receiver with the base and rotatable portions pivoted to a second predetermined portion relative to each other.

14. The wireless communication device of claim 10 wherein the rotatable portion includes circuitry for generating a second light beam, the base portion includes a light receiver, and
a second light redirecting mechanism generally oriented along the hinge axis for receiving the second light beam and redirecting the second light beam to travel in at least one predetermined optical path that extends transversely to the hinge axis and in which the base portion light receiver is disposed with the rotatable and base portions pivoted to a predetermined position relative to each other.

15. The wireless communication device of claim 10 further comprising a light pipe mounted to the base portion to receive the light beam and redirect the light beam along the hinge toward the light redirecting mechanism.

16. A method of optically transmitting data from a base portion to a rotatable portion of a wireless communication device, the method comprising:
generating a light beam by circuitry associated with the base portion for optically transmitting the data;
directing the light beam substantially along a hinge axis defined along a hinge between the base portion and the rotatable portion about which the base and the rotatable portions are pivotal relative to each other; and
redirecting the light beam from along the hinge axis in predetermined optical paths that extend transversely to the hinge axis and wherein the light beam is redirected radially to predetermined circumferential locations about a peripheral or annular ring of a light wheel that receives the redirected light beam, and wherein a light receiver associated with the rotatable portion is disposed with relative pivoting of the rotatable and base portions.

17. The method of claim 16 wherein the light beam is generated to be directed in a direction transverse to the hinge axis before being directed along the hinge axis.

18. The method of claim 16 including, during use of the wireless communication device, pivoting the rotatable portion to a closed position against the base portion to bring the light receiver into one of the predetermined optical paths, and pivoting the rotatable portion to an open position to extend away from the base portion to bring the light receiver into another one of the predetermined optical paths.

19. The method of claim 16, further comprising:
generating a light beam by circuitry associated with the rotatable portion for optically transmitting data;
directing the light beam substantially along the hinge axis; and
redirecting the light beam from along the hinge axis in predetermined optical paths that extend transversely to the hinge axis and in which a light receiver associated with the rotatable portion is disposed with relative pivoting of the rotatable and base portions.

* * * * *